Oct. 4, 1966 S. LARKIN 3,276,650
AUTOMATIC DEVICES FOR FEEDING UNEQUAL LENGTHS
OF STOCK INTO A MACHINE
Filed July 6, 1964
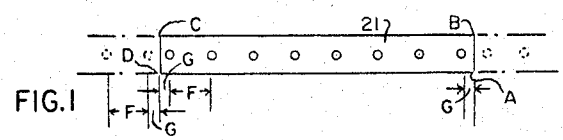
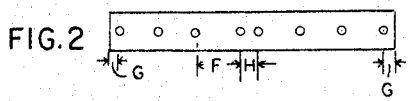
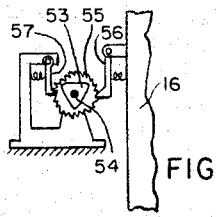
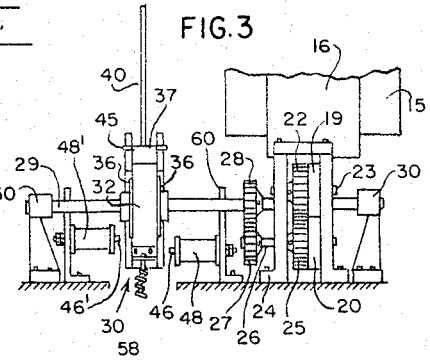
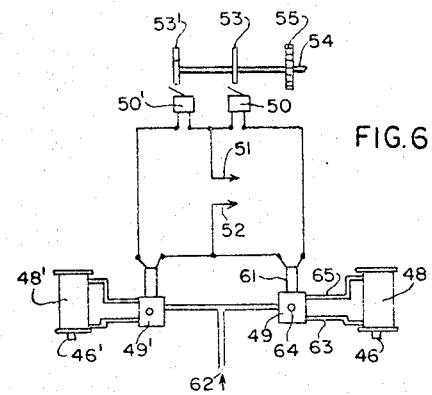
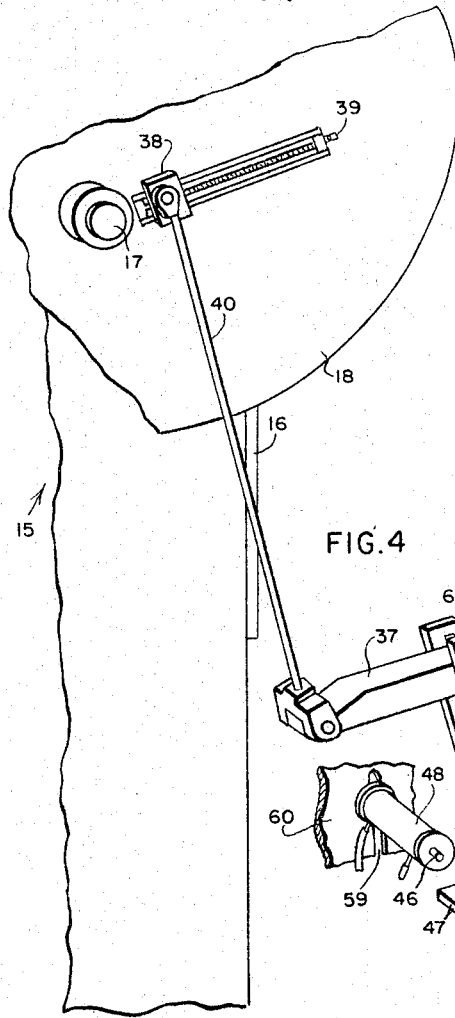
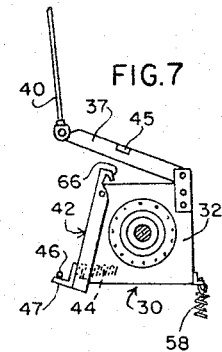
INVENTOR,
Sam Larkin,
BY
ATTORNEY.

3,276,650
AUTOMATIC DEVICES FOR FEEDING UNEQUAL LENGTHS OF STOCK INTO A MACHINE
Sam Larkin, 254 Beach 140th St., New York, N.Y.
Filed July 6, 1964, Ser. No. 380,447
7 Claims. (Cl. 226—123)

The present invention relates to automatic devices for intermittently feeding a wire, a strip or a web from an endless source of supply into a machine which does work on it during rest periods. Such machine for instance may be a punch press, a welding machine, a printing press or any other type in which a ram makes one reciprocation during each revolution of a powered shaft.

The principal object of this invention is to provide a novel and improved automatic feeding device of the character mentioned, for use with a machine which requires that one or more or all feeds of material during a series of feeds to it from a source of supply, shall be of unequal length; such series being endlessly repeated. Usually, at the completion of each series, the machine has a cut-off means, but this invention is not concerned with such means except to the extent that it effects the particular fed length in which said severance occurs.

For instance, a punch press may be required in each series of feeds, to punch holes successively or make successive formations which are unequally spaced along the stock fed to it, or a welding apparatus may be required to make welds at unequally spaced positions along the stock being fed to join other pieces thereto at such positions, or a printing press to make impressions on a web or tape at unequally spaced positions thereon.

A further object of this invention is to provide a novel and improved feeding device of the character described, which can be adjusted to effect the feeds required thereof as in necessary for the item being manufactured.

A further object thereof is to provide a novel and improved feeding device of the kind set forth, which is simple in construction, reasonable in cost and efficient in carrying out the purposes for which it is designed.

Other objects and advantages will become apparent as this disclosure proceeds.

For one practice of this invention, the device includes a pair of cooperating feed rollers which are positioned on the machine, to feed the stock towards the work station. Upon turning the shaft which drives said rollers the stock is fed into the machine. There is a clutch comprising a wheel rotatably mounted in a collar; said wheel being securely carried on said shaft. There are notches in the periphery of said wheel holding freely rotatable elements which securely engage said wheel with its collar when the collar is turned in one direction, and such engagement is undone when said collar is turned in the opposite direction. The machine has a wheel which may be its flywheel fixed on the constantly rotating powered crankshaft operating the ram or its equivalent. Feeding of the stock occurs when the ram is away from the work and allows its movement. A bar is pivoted at one end to said collar; the other end of such bar being pivotally connected to one end of a connecting rod. The other end of said connecting rod is pivotally connected to said wheel at a point off center; such point of connection to said wheel being adjustable to change its distance from the wheel's center. Said connecting rod is thus associated with a crank having an adjustable throw. A swingable latch on said collar holds said pivoted bar from moving on said collar and same is biased by a spring means to be in latching position. Said latch has an element extending therefrom to be engaged by a stop moved into its path at a prescribed time. There may be several of these stops and each may be operated by a pneumatic cylinder which is controlled by a timing device made operable by ram movement. The position of these stops may also be made adjustable. While said bar is unlatched so it is free to swing on the collar, no feeding of stock can occur.

In the accompanying drawing forming part of this specification, similar characters of reference indicate corresponding parts in all the views.

FIGS. 1 and 2 are surface views of perforated metal strips. They are different pieces of work which can be automatically endlessly made by a punch press set up for any of them, using my new stock feeding device; said press making one hole at a time and then cutting the strip off by a shearing blade made to operate after the series of holes have been made. The special spacing of the holes in said work pieces as well as the way my feed device is arranged therefor, will hereinafter be described in detail.

FIG. 3 is a fragmentary front view of a punch press equipped with a stock feeding device embodying the teachings of this invention.

FIG. 4 is an enlarged section taken at line 4—4 in FIG. 3. Here, the clutch is in actuatable condition.

FIG. 5 is a fragmentary side view of a timing mechanism to control the stop member which makes the clutch ineffective.

FIG. 6 is a diagrammatic showing of the electrical and pneumatic systems controlled by said timing means.

FIG. 7 is like FIG. 4, drawn to a reduced scale, but showing the clutch in ineffective condition.

In the drawing, I have chosen to show the present invention employed in a punch press 15 whose ram 16 makes a downward and then a return stroke at each revolution of the press's crankshaft 17 which carries the flywheel 18. The press is provided with the feeding rollers 19, 20, upon whose rotation, strip material 21 for example, is fed into the press to have work done thereon. The roller 19 and a gear 22 are secured on a shaft 23 which is journalled on a frame 24 which is fixed. The roller 20 and a gear 25 are secured on a shaft 26 which is journalled on the frame 24. This shaft 26, also has fixed thereon, the gear 27 which meshes with the gear 28 secured on the shaft 29; the latter being journalled in the fixed bearings 30. The gears 22 and 25 are in meshed engagement. It is evident that when the shaft 29 turns, the feeding rollers 19 and 20 will turn.

Said shaft 29 carries a clutch mechanism of the type which runs free in one direction and grips instantaneously in the other direction. This kind of clutch may consist of a wheel 31 rotatably fitted in a collar member 32; said wheel being secured to the shaft 29 and having spaced peripheral notches 33 therearound, each of which in part, is occupied by a rotatable member 34 which contacts both the floor 35 of the notch it is in and the interior wall of the collar. The floor of each notch slants away from the axis of the shaft 29, in the direction which is away from the normal rest position of the rotatable member 34, to which normal postion, said rotatable member is spring biased. So as seen in FIG. 4, upon rotation of the collar 32 in a clockwise direction, the shaft 29 will turn clockwise because the wheel 31 and its collar 32 will become engaged and upon rotation of said collar in a counter-clockwise direction, said shaft 29 will not turn, because said engagement is undone. At normal rest position, said rotatable members 34 are free to turn though they contact both the said wheel and its collar. To the extent described as above, said clutch means is well known and is given merely as an example of the type set forth. The rings 36, secured to the faces of the collar 32 and overlapping the wheel 31, serve to maintain the clutch assembly.

In the particular embodiment shown, the collar 32 is a rectangular block having a bar 37 positioned along its upper end extending beyond one of the block's side ends.

The distal end of the extending portion of said bar and a block 38 whose position on the flywheel 18 is adjustable by turning the radially-positioned screw 39 journalled on said fly-wheel, are pivotally linked respectivley to the ends of a connecting rod 40. The other end of the bar 37 is pivoted at 41 to said collar 32. A latch indicated generally by the numeral 42, pivoted to said collar at 43, is biased by a compression spring 44 housed in a suitable socket in the collar 32, to bear against the cross bar 45 which is secured across the bar 37. The position of the block 38 with respect to the axis of the fly-wheel 18 and the dimensions of the various components of the clutch and the stock-feeding mechanism, determine the length that the stock material 21 will be advanced by the feed rollers 19, 20 per revolution of the fly-wheel 18. If the clutch mechanism is allowed to remain in the condition shown in FIG. 4, then during each upstroke of the ram 16, an equal length of stock material 21 will be fed by the feed rollers 19, 20. So, if the press 15 is set to punch a hole upon each downward stroke of the ram, the holes made, would be equi-spaced along the strip 21. The feeding of the stock by the feed rollers, occurs during each return stroke of the ram 16.

However, I provide means to make the clutch 30 ineffective at selected times during selected upward strokes of the ram 16. In this manner, certain successive feeds are made to be different. To accomplish this, a pin 46 is caused to come into the path of movement of the element 47 which extends from the latch 42. It is evident that when said pin 46 intercepts the element 47, the latch will be released from the bar 45, whereupon the bar 37 will be free to swing on its axis 41, and no motion will be imparted to the block 32 by the connecting rod 40, until said bar 37 is again engaged to said block, upon the reengagement of the latch 42 and the cross bar 45. The position of said pin 46 will determine the amount of rotary movement of the shaft 29 during an upward stroke of the ram 16 and hence the length of the stock fed by the feed rollers 19, 20 during such upward stroke of said ram. Feeding of said stock will take place until the bar 37 is freed of the latch and there will be no feeding thereafter during the remainder of the upward stroke of said ram. Before said ram commences its next downward stroke, said pin 46 is shifted out of the path of said element 47, allowing the latch 42 to reengage the cross bar 45 while said ram moves downward to operate on the stock; the spring 58 serving to shift the block 32 to a position to facilitate such reengagement so that upon the upward stroke of the ram 16, the clutch 30 is again in condition to cause the stock to be fed. The spring 58 is attached at one of its ends to the block and at its other end to the frame of the machine and is in untensed condition after it has swung said block clockwise in FIG. 4 upon the opening of said latch.

Said pin 46 may be the piston rod of a double-acting pneumatic cylinder 48 whose position is adjustable along the heightwise slot 59 in a frame piece 60. The operation of this cylinder, in proper timed relation to the travel of the ram 16, may be accomplished by mechanism shown in FIGS. 5 and 6.

The numeral 49 indicates a solenoid-operated valve whose solenoid is in a circuit controlled by a microswitch 50 and powered from the mains 51, 52. Said switch is in turn controlled by a cam 53 secured on a shaft 54 which is journalled to the frame of the machine and also has a ratchet wheel 55 secured thereon. This ratchet wheel is engaged during each downward stroke of the ram 16, by a pawl 56 which is spring-biased and swingably carried on said ram. The numeral 57 denotes a spring-biased pawl swingably mounted on the frame and in engagement with said ratchet wheel to hold said wheel, but said pawl 57 is free to ride on said ratchet wheel while the latter is engaged and moved by the pawl 56. The number of teeth in said ratchet wheel and the design of said cam 53, are determined by the nature of the work to be done by the press, as will be shown.

As a matter of example, presume that the press 15, which is fed strip material 21 from an endless source of supply, is to be set up to make pieces as shown in full lines in FIG. 1, each such strip to have eight holes therealong, which are a distance of F apart, but the distance from the center of each end hole to the adjacent end of the piece, shall be G which is less than half the distance F.

Regardless of how cut-off is effected at the line AB and then at the line CD when the latter reaches the position of cut-off station (not shown), this invention is concerned only with the feeding of the strip stock 21. Hence to accomplish the required work, successive feeds of the strip material to the machine 15, are made to be equal and each is a length F, except that each eighth feed is a length twice G.

For such set up, the ratchet 55 is one having 24 teeth, while the cam 53 has the shape of an equilateral triangle. During each downward stroke of the ram 16, said ratchet wheel 55 is shifted one tooth. Hence at each eighth downward stroke of said ram, the cam will close the switch 50 and hence operate the cylinder 48 whereby rod 46 is set into the path of element 47. Upon the very next stroke of said ram downwardly, said cam 53 will have moved so the switch 50 is opened, thereby operating said cylinder 48 to move the rod 46 out of the path of the element 47.

The position of the block 38 along the screw 39 is such that the feed of the stock effected per downward stroke of the ram 16, is a length F. The position of the cylinder 48 is such that when the rod 46 is in the path of the element 47 and the latch 42 is opened to free the bar 37, the extent of feed accomplished up to such point of release, will be twice the length G.

If the work piece to be done is as shown in FIG. 2, in which the number of holes and their spacing is like that of FIG. 1, except that the distance between centerlines of the fourth and fifth holes is H which is less than F but different than twice G, then I provide a second latch opening means by having a second cylinder 48′ similarly associated with components akin to those associated for the control of the cylinder 48, and correspondingly numbered but primed. Of course, the cams 53, 53′ are oriented so that the switch 50 is closed while the pawl 56 is at the 8th, 16th and 24th tooth of the ratchet wheel and so that the switch 50′ is closed while said pawl 56 is at the 5th, 13th and 21st tooth of said ratchet wheel.

For any spacing arrangement, the block 38 is set to effect the largest feeding length and there is one latch opener means for every other different feeding length required and such is positioned to accomplish as required, in association with suitable cams on the shaft 54 properly oriented in relation to a ratchet wheel as 55, but of a proper number of teeth which shall be a multiple of the number of holes in the work piece to be made.

The ratio of the length of feed of strip material 21 effected by the feed rollers 19, 20 during each upward stroke of the ram 16, to the maximum length of strip material said rollers would feed if there is no release of the latch 42 during such a stroke, is equal to the ratio of the extent of movement of the block 32 effected by the connecting rod 40 during each upward stroke of the ram 16 before the release of the latch 42, to the extent of movement of said block 32 if there is no release of said latch during such stroke.

When the switch 50 is open, the solenoid 61 of the valve 49 is deactuated and compressed air fed in at 62, will enter the cylinder 48 through piping 63 whereby the piston rod will assume a position into said cylinder and be out of the path of the element 47 of the latch 42, and simultaneously, valve action is such that the other end of the cylinder is open to atmosphere through the opening 64 which becomes communicative with the piping 65. When the switch 50 is closed by the cam 53, the solenoid is actuated and said valve 49 becomes so arranged that the compressed air will enter the cylinder through piping 65 whereby the piston rod 46 will be moved into the path of said element 47 and the opening 64 to the atmosphere becomes connected the piping 63. This form of valve is well known in the machine art.

As soon as the rod 46 is intercepted by the said element 47, the latch 42 is automatically opened and the bar 37 becomes released as shown in FIG. 7, whereupon the collar 32 of the clutch 30 stops turning while the connecting rod 40 completes its upward movement. Upon downward movement of said connecting rod, it will swing the bar 37 downward towards the collar 32 and the cross bar 45 coming into contact with and moving along the inclines 66, said latch 42 will be cammed and again engage said bar 45, whereupon the condition of the mechanism will again be as in FIG. 4. The collar 32 and the bar 37 will again move together.

The operation of the circuit controlled by the cam 53', is identical to that set forth for the circuit controlled by the cam 53.

Though I have chosen a punch press equipped as shown to explain this invention, it shall be deemed a mere example of its use for same may be employed in any machine in which a ram is reciprocating continuously or intermittently and which requires different lengths of stock material to be fed therein to be worked on, at predetermined strokes of said ram. The machine may be a welding apparatus which at each downward stroke of its ram, a cross element is welded onto a wire or strip being fed into the machine, where the spacing of such cross pieces are not all identical or all different. Wherever a feeding device is used which heretofore fed identical lengths of stock, my invention may be used to feed non-identical lengths.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description and showing herein to indicate the scope of this invention.

I claim:
1. In combination with a device driven by a shaft journalled on a frame, for intermittently feeding a portion of a supply of material into a machine which includes a reciprocatable ram carrying means to do work on said material during the operating stroke of said ram when said shaft is at rest, a clutch comprising a wheel secured on said shaft, a collar around and coaxial with said wheel and means associating said wheel and collar whereby said wheel and collar become engaged to move together when the collar is turned in one direction and disengaged when said collar is turned in the opposite direction, a member swingably mounted on said collar, having a normal rest position thereon, a latch movably mounted on said collar, biased so that when said swingable member is in its normal rest position on the collar, said latch will engage said member and hold it in said normal rest position on the collar; said latch having a first element extending therefrom which when held against movement while the collar turns in engagement with the wheel, will cause said latch to move to release said member to be free for swinging movement in relation to said collar, a second element movably mounted on the frame and so positioned thereon that it is adapted when shifted from a normal rest position, to enter into the path of said first element at a predetermined position between the ends of said path, a second member pivotally connected to said swingable member at a region spaced from the axis of swing of said swingable member so that upon movement of said second member while said swingable member is held in its normal rest position, said collar will turn, means for moving said second member in one general direction while the ram is making an operating stroke and in the opposite general direction while the ram is making its return stroke during each reciprocation of the ram and means operated by the ram at a predetermined time in a predetermined stroke included in predetermined series of reciprocations thereof, adapted to shift said second element into the path of said first element and during a predetermined succeeding stroke of said ram, to shift said second element back to its normal rest position out of said path.

2. The apparatus as defined in claim 1, wherein the second member is moved during the return strokes of the ram, in such direction that it will cause the collar to turn in the direction whereupon it becomes engaged with the wheel.

3. The apparatus as defined in claim 1, wherein the ram is moved by mechanism including a wheel which turns one revolution for each reciprocation of said ram; said second member being a connecting rod, one end of which is pivotally conected to the wheel included in said mechanism for moving the ram and the other end of which is connected to said first member which is swingably mounted on the collar.

4. The apparatus as defined in claim 3, including means on said wheel included in said mechanism for moving the ram, for adjusting the point of connection of the connecting rod on such last mentioned wheel to alter its distance from the axis of rotation of such wheel.

5. The apparatus as defined in claim 3, wherein the swingable member is a bar whose connection to the collar is at one end of said bar; said bar extending away from said connection towards and beyond the latch so said latch is intermediate the ends of said bar; the other end of said bar being connected to said connecting rod; said latch being a swingable member on the collar and said first element extending from said latch in the general direction of said bar towards said other end of said bar; the second element being positioned intermediate said bar and the second element.

6. The apparatus as defined in claim 1, wherein the first member is a bar whose connection to the collar is at one end of said bar; said bar extending away from said connection towards and beyond the latch so said latch is intermediate the ends of said bar; the other end of said bar being connected to the second member; said latch being a swingable member on the collar and the first element extending from said latch in the general direction of said bar towards said other end of said bar; the second element being positioned intermediate said bar and the second element.

7. An apparatus as defined in claim 1, including at least one additional element movably mounted on the frame and adapted to be shifted into said path at different positions in said path respectively and means operated by the ram at predetermined times in other predetermined strokes included in said series of reciprocations thereof, adapted to shift said additional elements into and out of said path in a predetermined timed relation with respect to the movement of the second element.

References Cited by the Examiner
UNITED STATES PATENTS
2,368,892  2/1945  Skoog.

M. HENSON WOOD, Jr., *Primary Examiner.*
A. N. KNOWLES, *Assistant Examiner.*